(12) United States Patent
Petitpas

(10) Patent No.: US 8,720,698 B2
(45) Date of Patent: May 13, 2014

(54) SEAFOOD GRADING APPARATUS

(76) Inventor: Roger J. Petitpas, New Bedford, MA (US)

( * ) Notice: Subject to any disclaimer, the term of this patent is extended or adjusted under 35 U.S.C. 154(b) by 0 days.

(21) Appl. No.: 13/551,994

(22) Filed: Jul. 18, 2012

(65) Prior Publication Data

US 2014/0021108 A1    Jan. 23, 2014

(51) Int. Cl.
*B07C 5/12* (2006.01)
(52) U.S. Cl.
USPC ............ 209/669; 209/667; 209/670; 209/673
(58) Field of Classification Search
USPC ................................ 209/667, 669, 670, 673
See application file for complete search history.

(56) References Cited

U.S. PATENT DOCUMENTS

| | | | | | |
|---|---|---|---|---|---|
| 1,347,215 | A | * | 7/1920 | Eby | 209/669 |
| 1,882,130 | A | * | 10/1932 | Fielder | 209/669 |
| 3,260,364 | A | * | 7/1966 | England | 209/668 |
| 4,532,677 | A | * | 8/1985 | Wenstrom et al. | 452/19 |
| 5,024,335 | A | * | 6/1991 | Lundell | 209/618 |
| 5,360,119 | A | * | 11/1994 | Nakamura et al. | 209/618 |
| 5,373,947 | A | * | 12/1994 | Nakamura et al. | 209/618 |
| 7,581,648 | B2 | * | 9/2009 | Greenbank et al. | 209/621 |
| 2012/0131894 | A1 | * | 5/2012 | Pellenc et al. | 56/328.1 |

FOREIGN PATENT DOCUMENTS

DE    3116699 A1 * 11/1982    ............ B07B 13/075

* cited by examiner

*Primary Examiner* — Patrick Cicchino
(74) *Attorney, Agent, or Firm* — Slater & Michaelson

(57) ABSTRACT

A seafood grading apparatus that includes a first roller supported from the frame; a drive motor for rotating the first roller about a longitudinal axis thereof; a second roller also supported from said frame and constructed and arranged in juxtaposition to the first roller. The first roller has a helical outer surface, and the second roller is for driving about a longitudinal axis thereof and in unison with the first roller. An inlet port receives pieces of seafood for the purpose of the grading thereof and arranged relative to the rollers to dispose the seafood between the rollers. At least two receiving trays are disposed downstream of the inlet port for receiving different respective size seafood pieces.

20 Claims, 11 Drawing Sheets

SEAFOOD GRADING APPARATUS

FIELD OF THE INVENTION

The present invention relates in general to an apparatus and device for grading seafood. More particularly, the present invention relates to a seafood grading apparatus particularly adapted for the size grading of scallops.

BACKGROUND OF THE INVENTION

There are existing machines for grading the size of scallops. These may be considered as separated into two different categories. First, there are mechanical type grading devices. One such device is of a drum style. The problem with these types of devices is that they are relatively complex in construction and thus expensive to produce. Another form of apparatus for grading scallops is one based upon weighing individual scallops. This turns out to be a very expensive system.

Figure 11:
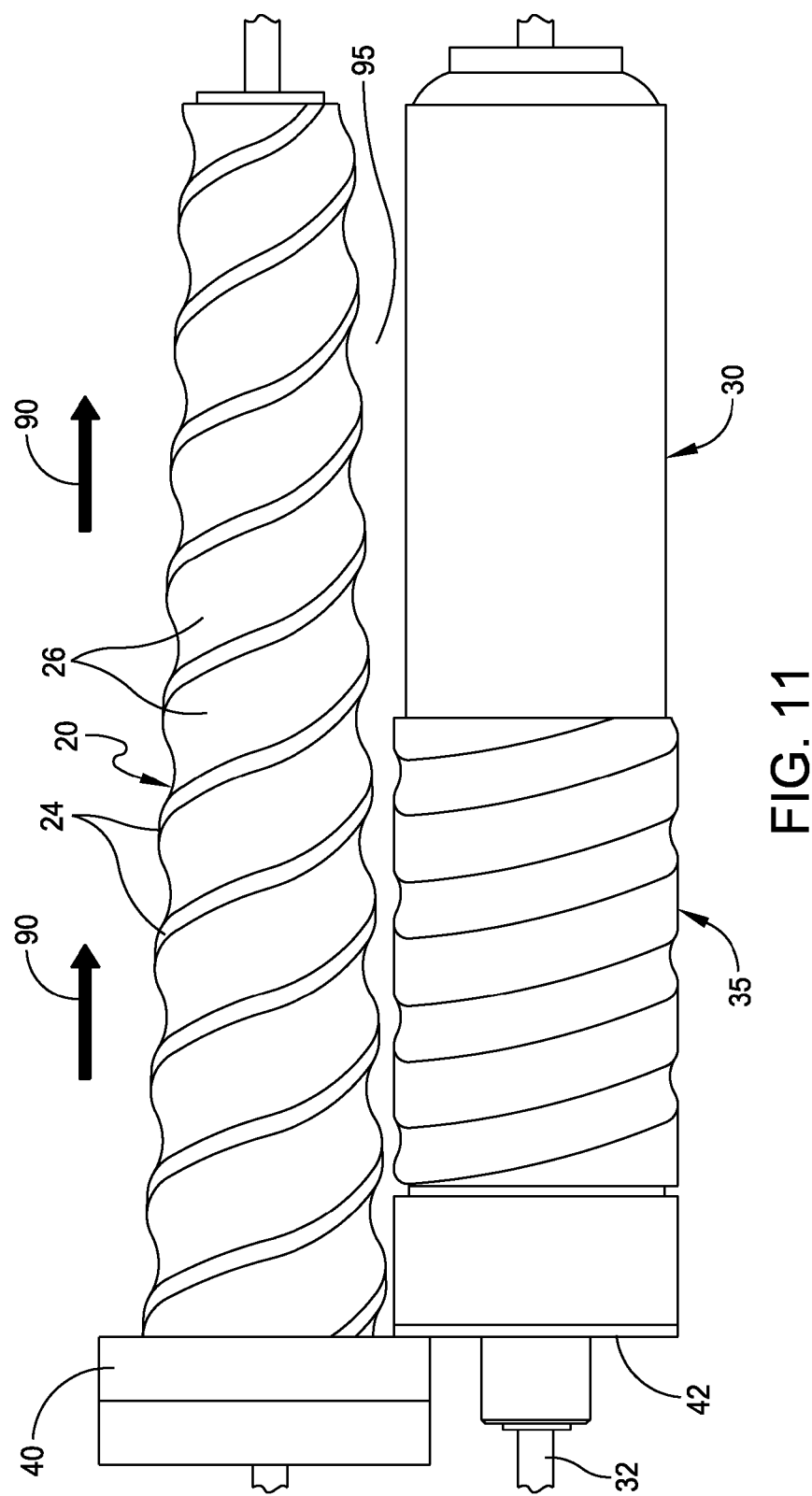

Accordingly, it is an object of the present invention to provide an improved apparatus for grading pieces of seafood and in particular for the grading of the size of scallops.

SUMMARY OF THE INVENTION

To accomplish the foregoing and other objects, features and advantages of the present invention there is provided a seafood grading apparatus, comprising: a support frame; a first roller supported from the frame; a drive motor for rotating the first roller about a longitudinal axis thereof; said first roller having a helical outer surface; a second roller also supported from said frame and constructed and arranged in juxtaposition to said first roller; said second roller constructed and arranged for driving about a longitudinal axis thereof and in unison with said first roller; an inlet port for receiving pieces of seafood for the purpose of the grading thereof and arranged relative to said rollers to dispose the seafood between the rollers; and at least two receiving trays disposed downstream of inlet port for receiving different respective size seafood pieces.

In accordance with other aspects of the present invention the drive motor is selected from one of an electrical motor, a pneumatic motor, a hydraulic motor or a manually driven mechanism; the helical outer surface of the first roller includes a peak edge of helical form and a trough surface of helical form; the size of the graded seafood is a function of a depth dimension between the peak edge and bottom of the trough surface; the second roller also has at least a section thereof that includes a helical surface; the first and second rollers are driven in opposed clockwise directions and the first roller helical surface includes turns constructed and arranged to be in the same direction as turns of the second roller helical surface; the second roller may alternatively have a smooth outer surface; the second roller includes opposed end supports, at least one of which is adjustable as to the spacing between the first and second rollers; the second roller may be spring biased; the spacing between the rollers is tapered so that there is a greater space at one end of the rollers than at the opposite end thereof; the spacing is less at the inlet port end of the rollers; both ends of the second roller are adjustable as to the separation space between the first and second rollers; one or both ends of the second roller can be adjusted to vary a taper space between the first and second rollers; the second roller has a helical surface that is shorter in length than the helical surface of the first roller; including more than two receiving trays disposed spaced along the length of the rollers; the first roller has the helical surface tapered; and including a contact disk driven by the drive motor for contacting and driving the second roller in unison.

In accordance with another embodiment of the present invention there is provided a method of grading seafood, particularly scallops, said method comprising the steps of: providing a first roller that has a helical outer surface includes a peak edge of helical form and a trough surface of helical form, and wherein the size of the graded scallops is a function of a depth dimension between the peak edge and bottom of the trough driving the first roller rotationally in a first direction and about a longitudinal axis thereof; providing a second roller that is constructed and arranged in juxtaposition to the first roller; driving the second roller about a longitudinal axis thereof and in unison with said first roller; disposing the scallops between the first and second rollers for the purpose of the grading thereof; and, upon the drive of the first and second rollers, receiving different respective size scallops in respective receiving trays.

In accordance with still other aspects of the present invention including providing a drive to the second roller in an opposite rotational direction to that of the first roller; wherein the first roller helical surface includes turns constructed and arranged to be in the same direction as turns of the second roller helical surface, and wherein the second roller also has at least a section thereof that includes a helical outer surface that includes a peak edge of helical form and a trough surface of helical form.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 1 is a perspective view of one embodiment of seafood grading apparatus in accordance with the present invention;

FIG. 2 is a fragmentary perspective view taken at one end of the apparatus;

FIG. 3 is a fragmentary perspective view of the portion of the apparatus illustrated in FIG. 2 and further illustrating an adjustment mechanism;

FIG. 4 is a fragmentary perspective view taken at the opposite end of the rollers comprising the apparatus;

FIG. 5 is an exploded perspective view of the apparatus of FIG. 1;

FIG. 5A is a fragmentary perspective view of a portion of the second roller for an alternate embodiment thereof;

FIG. 6 is a cross-sectional view taken along lien 6-6 of FIG. 5 and showing further parts of the spring-loaded mechanism for the roller;

FIG. 7 is a further fragmentary perspective view showing mechanisms disposed between the rollers for providing drive therebetween;

FIG. 8 is a schematic view illustrating the direction of rotation of the respective first and second rollers;

FIG. 9 is a plan view of the apparatus of FIG. 1;

FIG. 10 is a perspective view of an alternate embodiment of the present invention employing more than two sizing trays; and FIG. 11 is a plan view of an alternate embodiment of the present invention including a tapered first roller.

DETAILED DESCRIPTION

Reference is now made to a first embodiment of the present invention illustrated in FIGS. 1-9. FIGS. 10 and 11 illustrate an alternate embodiment of the present invention. Also, FIG. 5A illustrates a slightly different embodiment for the second roller construction. It is noted from the embodiment of FIG. 10, that the apparatus of the present invention can be manufactured in a variety of different lengths. Moreover, a plurality of such apparatuses may be stacked in a tandem manner. In that case, each of the sets of rollers is disposed in parallel to an adjacent set.

Figure 1:
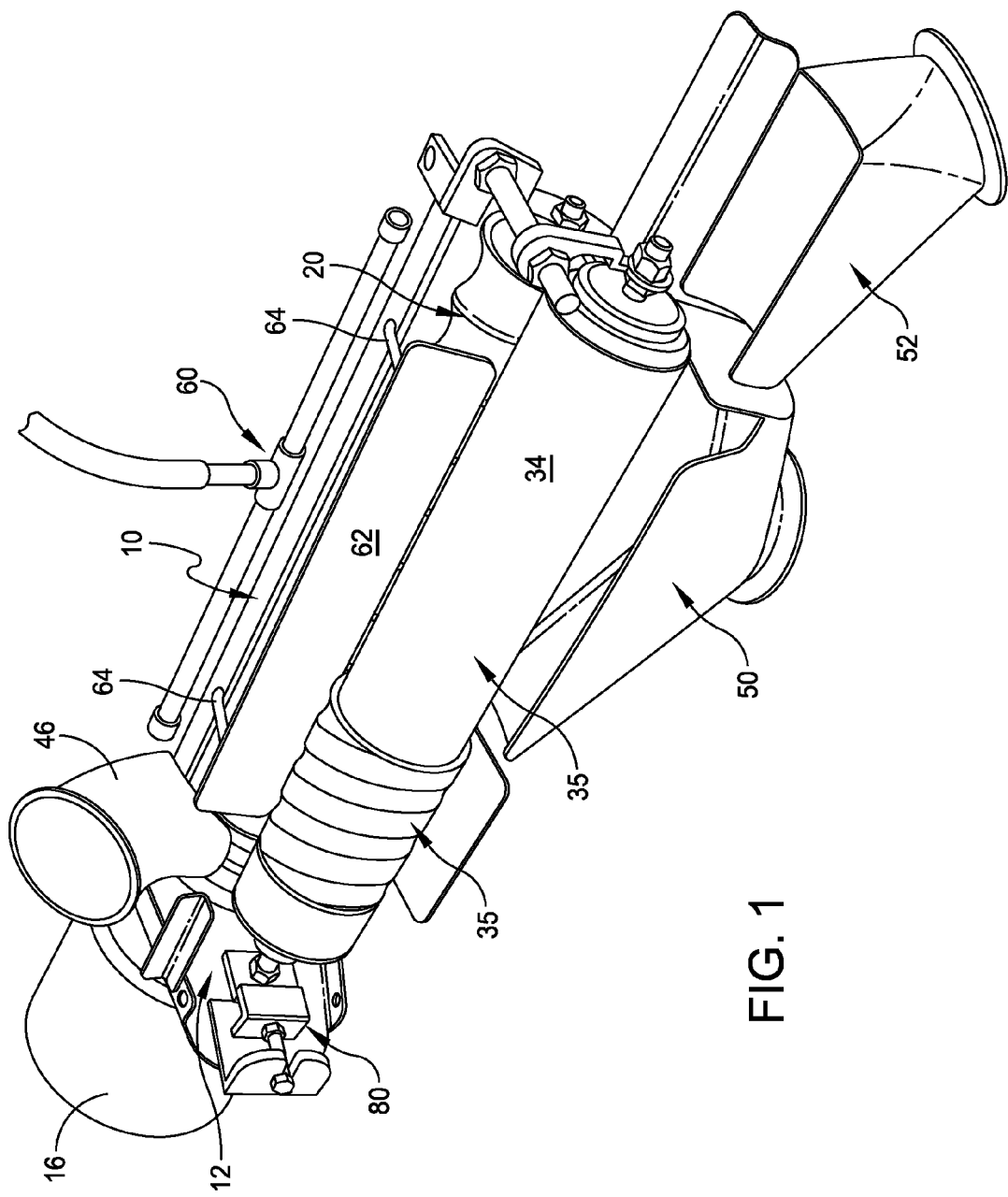
Figure 2:
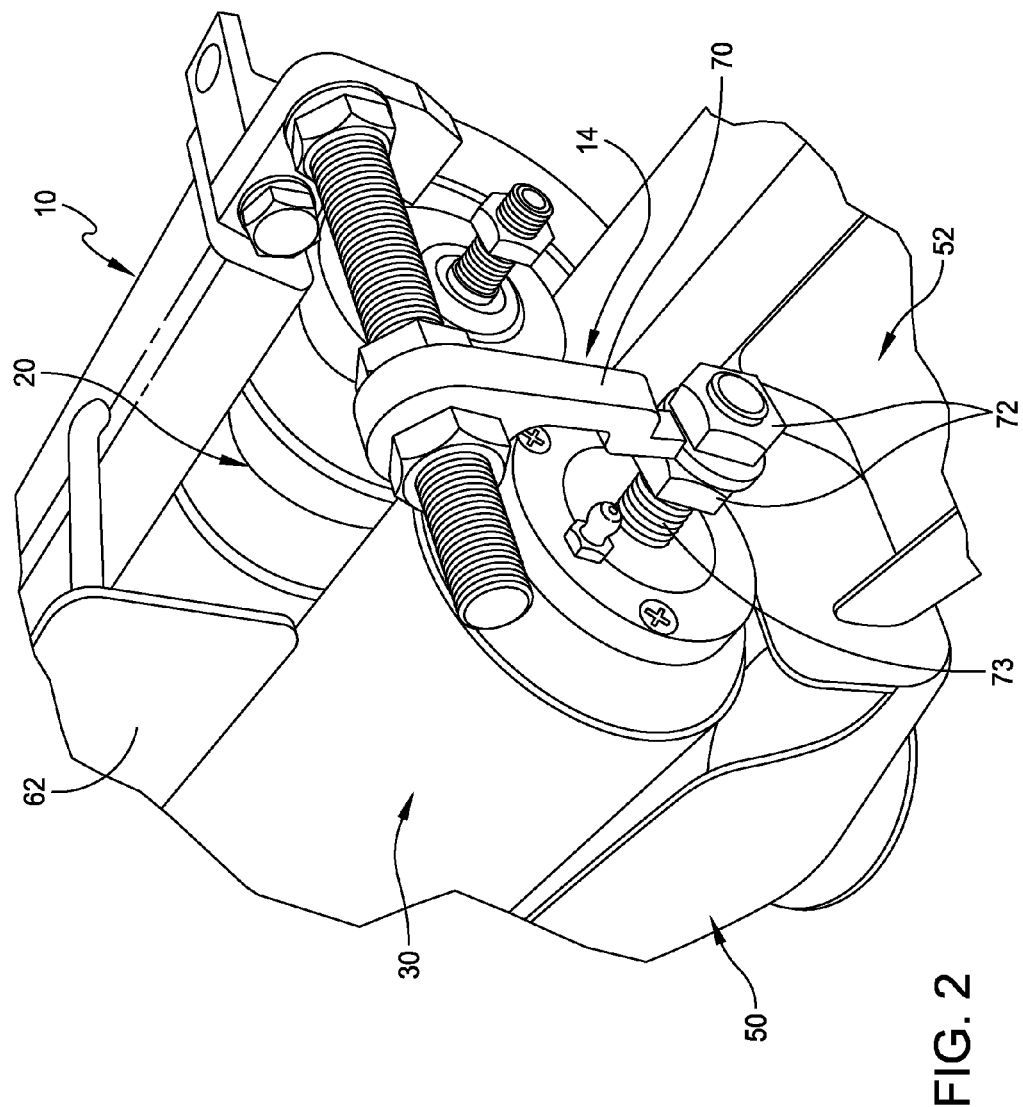
Figure 4:
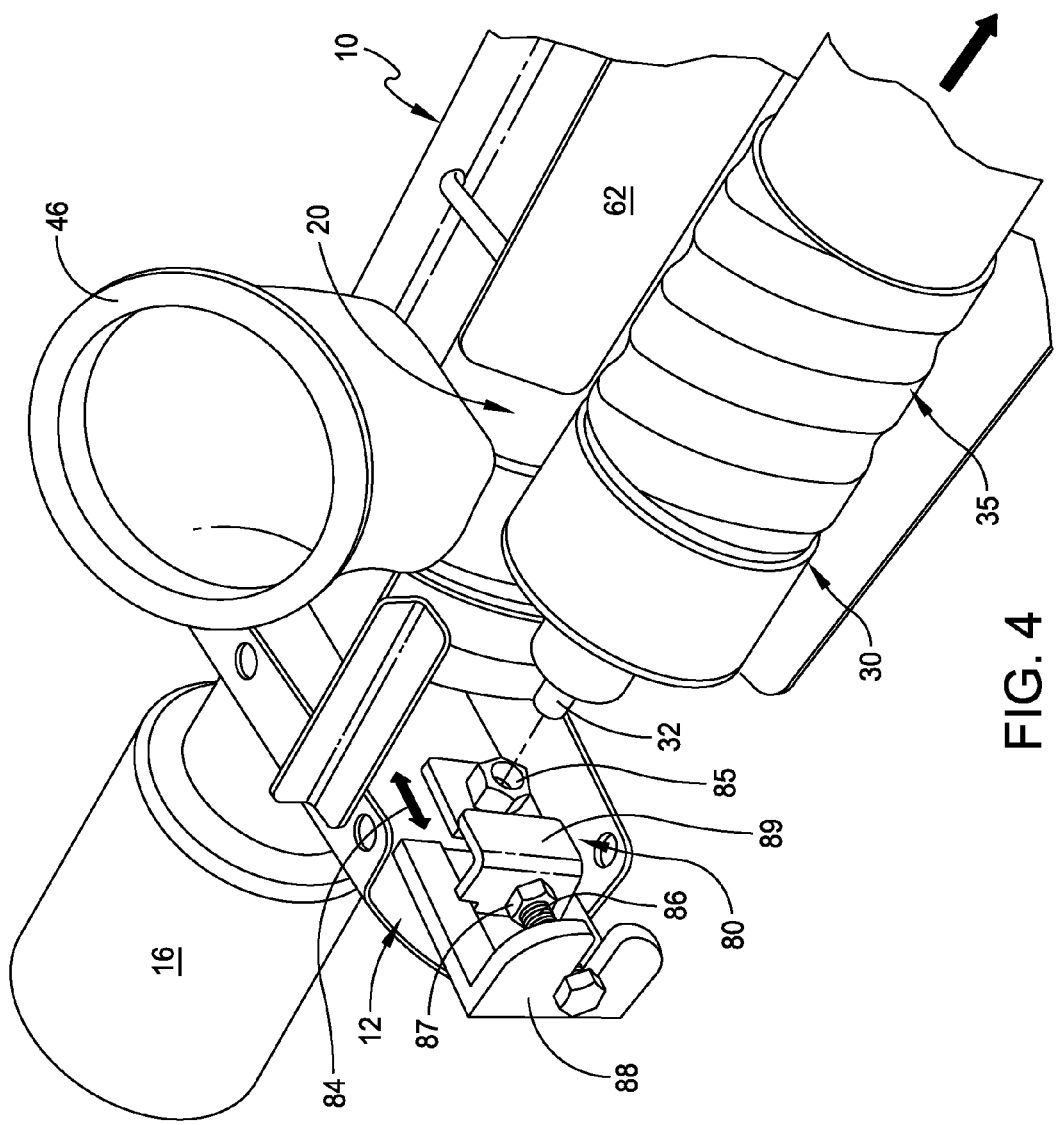
Figure 5:
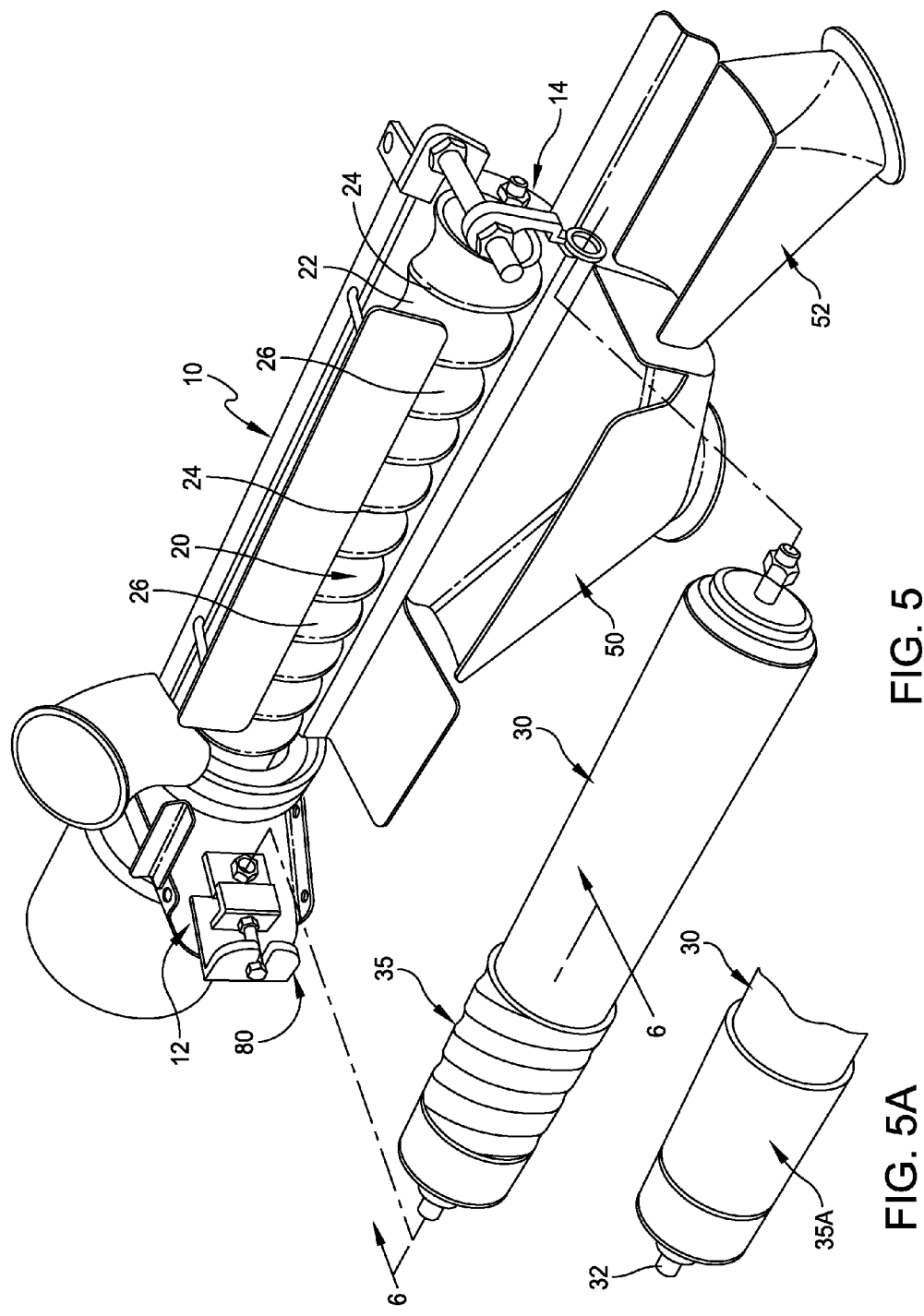

The apparatus of the present invention is basically comprised of a main support frame 10. This support frame 10 may be constructed of a metal material and may have an elongated somewhat arcuate shape with the aligned rollers at least partially supported therein. The support frame 10 may also include an end plate 12, such as illustrated in FIGS. 1, 4 and 5. The end plate 12 may also be constructed of a metal material or possibly a hard plastic material. At the opposite end of the rollers, there is also a support mechanism 14 that is for support of the opposite end of the rollers. The apparatus is also comprised of a first roller 20 which is the main drive roller and a second roller 30. The first roller 20 is driven directly from a drive motor 16 which rotates the first roller about a longitudinal axis thereof. In this regard, refer also to FIG. 8 that shows the roller 20 driven in the direction of arrow A which is a clockwise direction. This rotation causes a corresponding rotation of the roller 30 in the direction of arrow B, namely in a counterclockwise direction.

Figure 7:
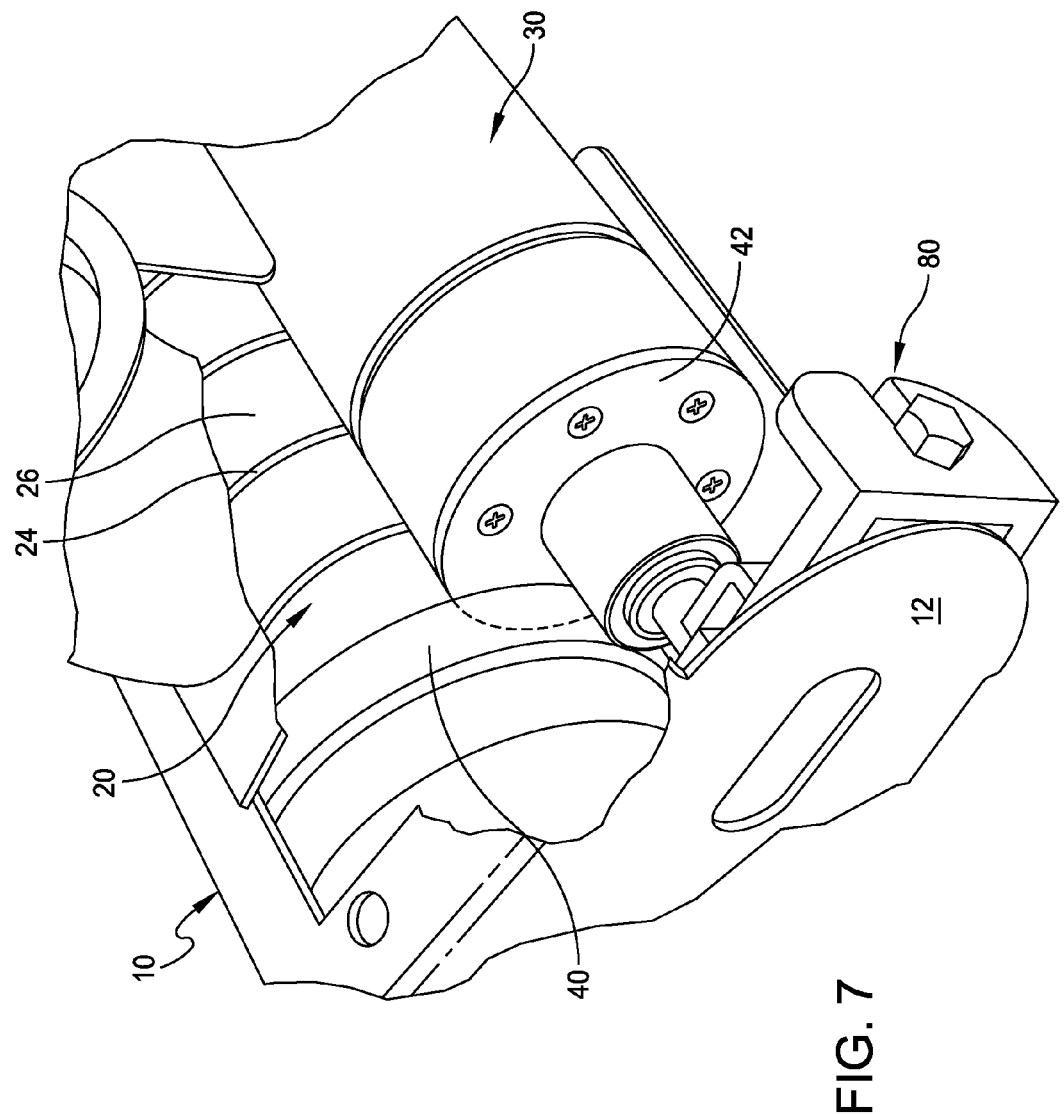
Figure 9:
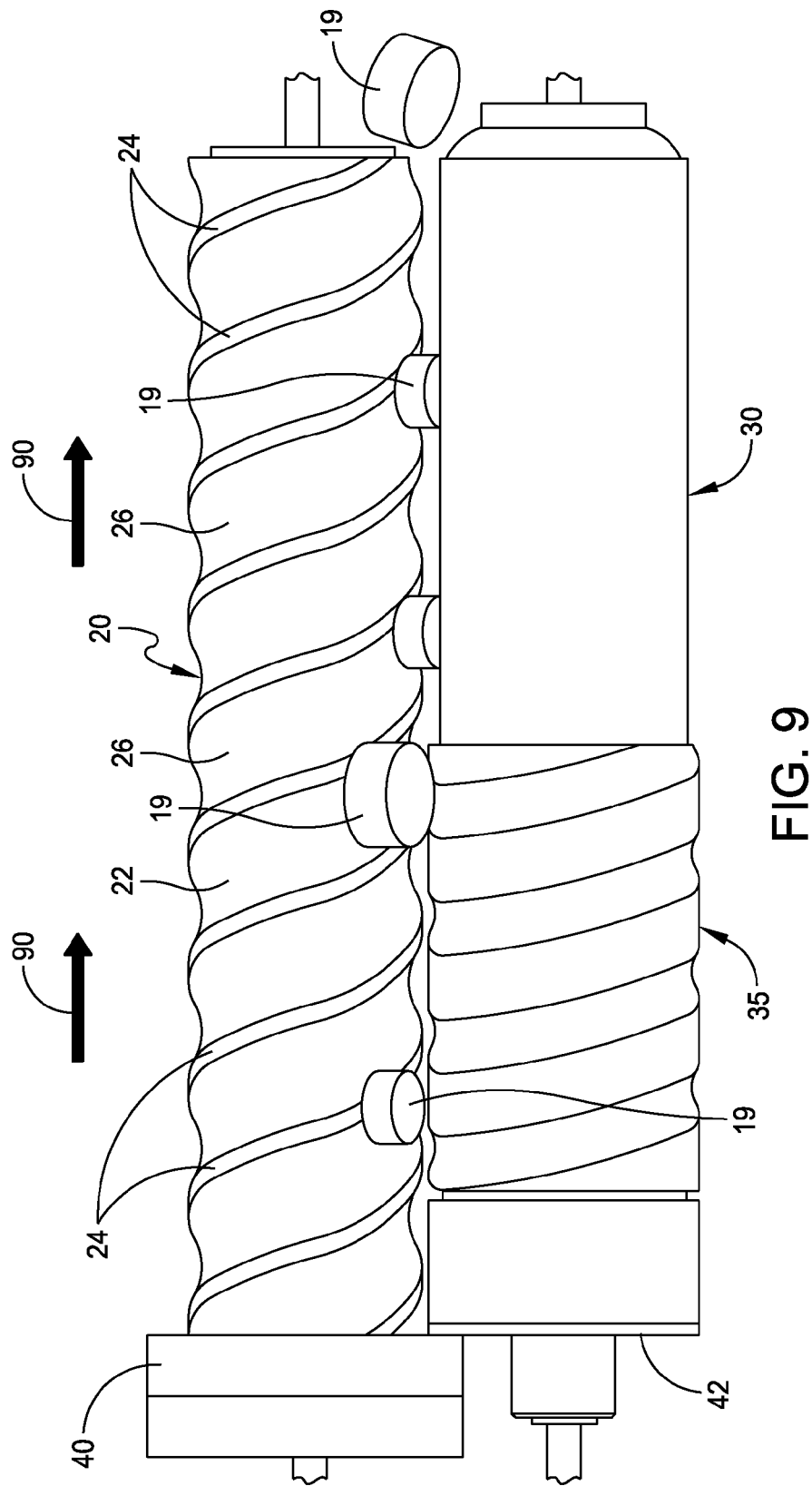
Figure 10:
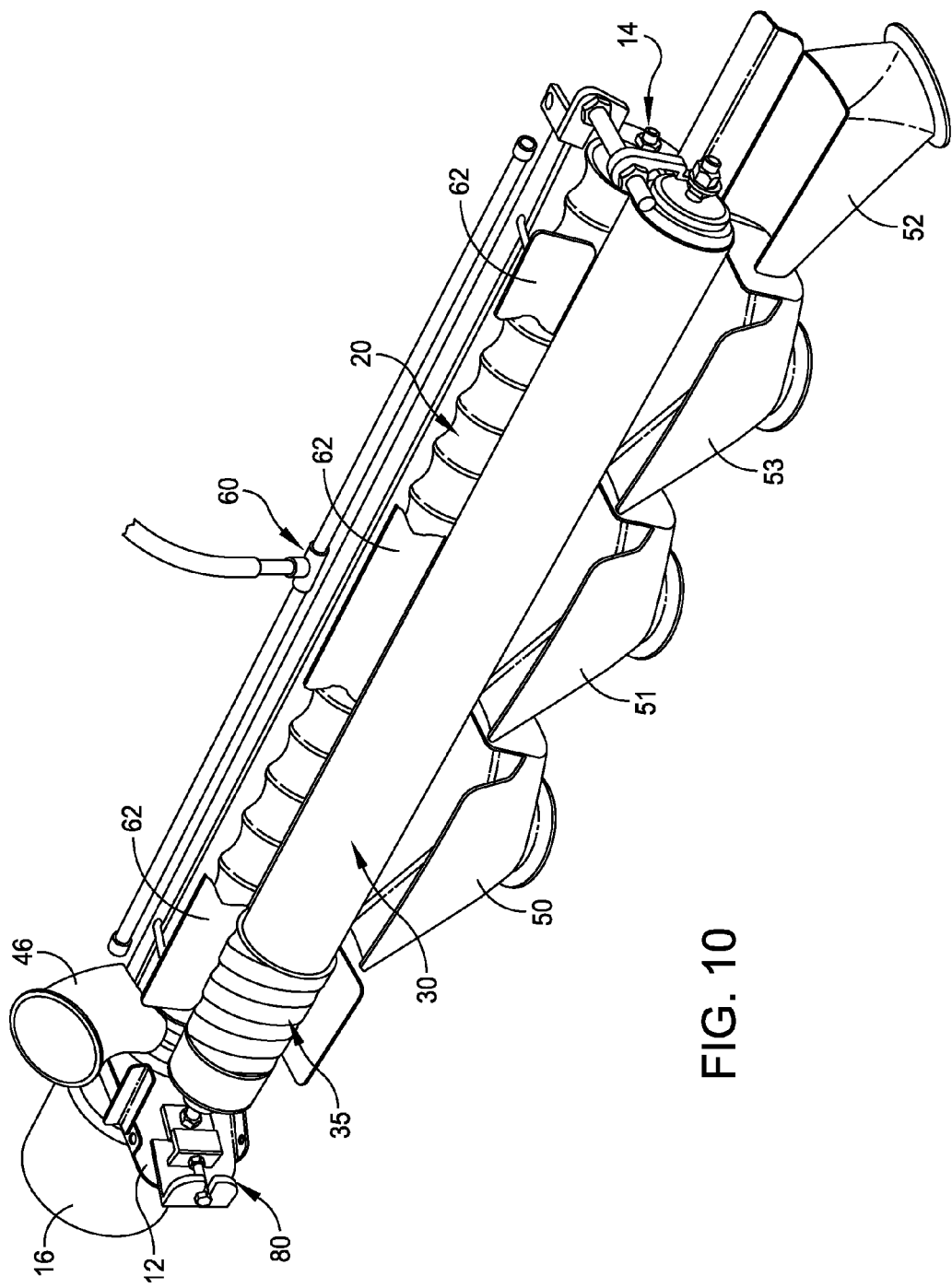

The first roller 20 is provided along substantially its entire length with a helical surface 22 (see FIG. 9). This helical surface 22 is formed by a peak edge 24 that is in a helical form and defining therebetween a trough surface 26 that is also of helical form. As can be observed in FIG. 9, there is a variation between the peak and trough with any scallops 19, particularly of smaller size as illustrated in FIG. 9, fitting within the trough surface 26 so that the smaller scallops, as the roller 20 is rotated, can fall into an appropriate tray. Thus, the motor 16 is used for a direct drive of the roller 20. The second roller 30 is constructed and arranged for driving about a longitudinal axis thereof and in unison with the first roller. The illustrated embodiment shows one way for providing this drive in the form of a disk 40 at the proximal end of roller 20. In this regard, reference may be made to FIG. 7 showing the disk 40 which is driven from the motor 16 and which engages the drive plate 42. Refer also to the plan view of FIG. 9 that shows the drive disk 40 that, at its periphery, is in contact with the plate 42 for causing rotation of the plate 42, and in turn, rotation of the second roller 30.

With further reference to, for example, FIG. 1, it is noted that the apparatus also includes an input port 46 where the scallops or other pieces of seafood may be deposited. The inlet port 40 is constructed and arranged relative to the rollers so as to dispose the scallops between the rollers. In the plan view of FIG. 9, although the inlet port 46 is not illustrated, it would be positioned so that the scallops fall at a position basically between the rollers 20 and 30. FIG. 1 also illustrates, in this particular embodiment, two receiving trays 50 and 52. Refer also to the exploded view of FIG. 5 which shows somewhat more detail of the trays 50 and 52. These trays are meant to be held in a fixed position and are for receipt of scallops. The receiving trays are disposed downstream of the inlet port and are for receiving different respective size scallops. In this regard, the smaller scallops are deposited into the tray 50 and larger scallops are deposited into the end tray 52. The plan view of FIG. 9 illustrates some of the smaller scallops that will be dropped between the rollers while the larger scallops are only released at the very end of the roller arrangement into the tray 52. Each of the trays 50 and 52 may have a respective outlet port that can connect it to other apparatus for holding the graded scallops. Again, and with reference to FIG. 9, the size of the scallops that are considered to be smaller are basically determined by the depth dimension between the peak edge 24 and the bottom of the trough surface 22. The deeper the trough surface, the larger size that the scallop will be received.

The perspective view of FIG. 1 also illustrates an irrigation mechanism at 60. This mechanism may take on various forms but basically is a means for spraying water onto the rollers so that the water is essentially used as a lubricant in the process. FIG. 1 also illustrates a bar 62 that is preferably fixed in position. The bar 62 may be supported by legs 64 from the frame 10. The bar 62 holds these scallops in position between the rollers.

The roller 20 is supported for rotation, driven from the motor 16. The other roller 30, on the other hand, is adjustable both longitudinally as well as in an adjustable space relationship relative to the roller 20. With respect to FIGS. 2 and 3, the support mechanism 14 at the distal end of the rollers provides for a longitudinal adjustment by means of the arm 70 and adjustment nuts 72. The adjustment nuts 72 are disposed along a threaded shaft 73. The threaded shaft 73 is supported from the distal end of the roller 30. Both of the rollers 20 and 30 may have associated therewith support bearings that are not specifically shown in the drawings.

Figure 6:
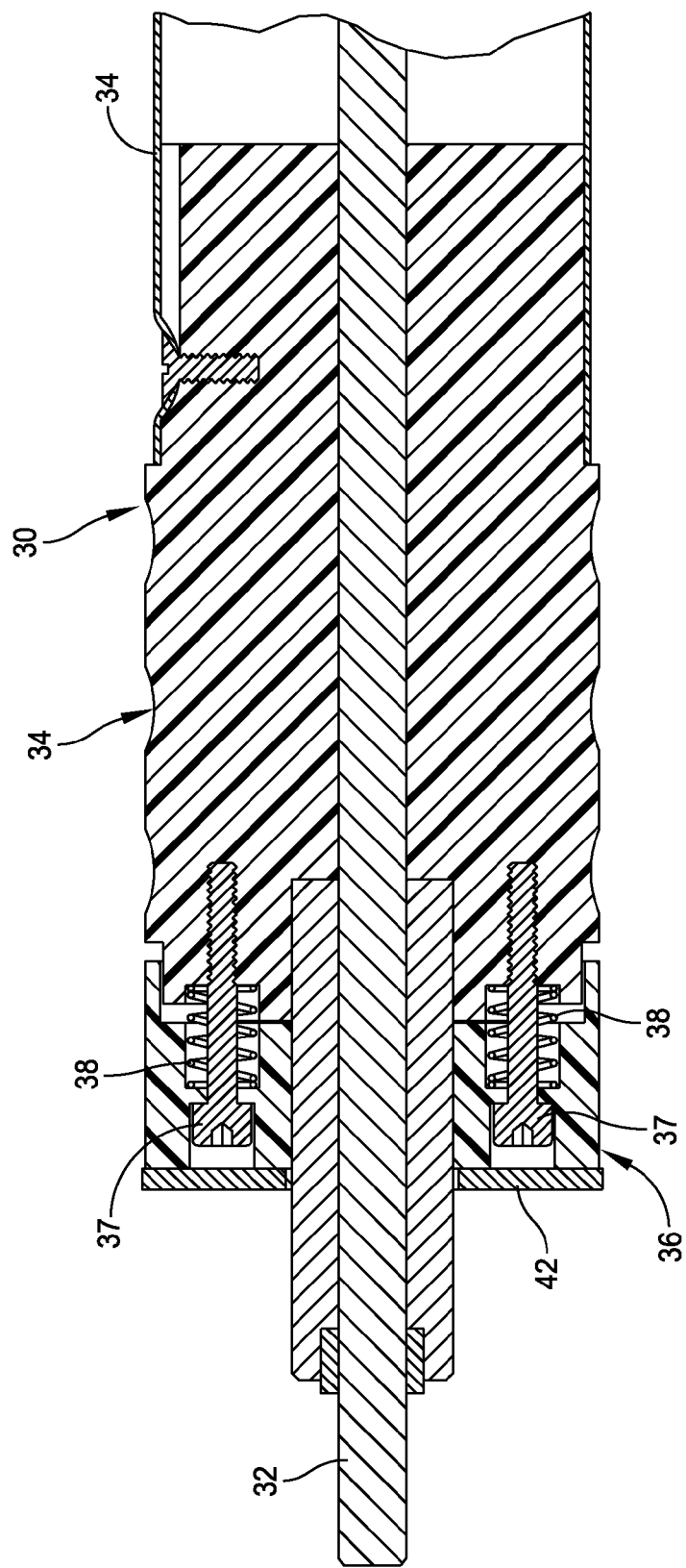

With reference to FIG. 6, it is noted that the proximal end of the roller 30 shows a main support shaft 32, a metal shaft housing 34, and a segment 35 of roller which also is of helical form having peak areas and trough areas such as illustrated in FIGS. 1, 6 and 9. The very proximal end of the roller 30 includes a cap 36 that is spring loaded with respect to the roller segment 35. FIG. 6 illustrates the screws 37 and springs 38. It is the adjustment at the nuts 72 and threaded shaft 74 that can provide different degrees of bias between the helical segment 35 and the cap 36.

Figure 3:
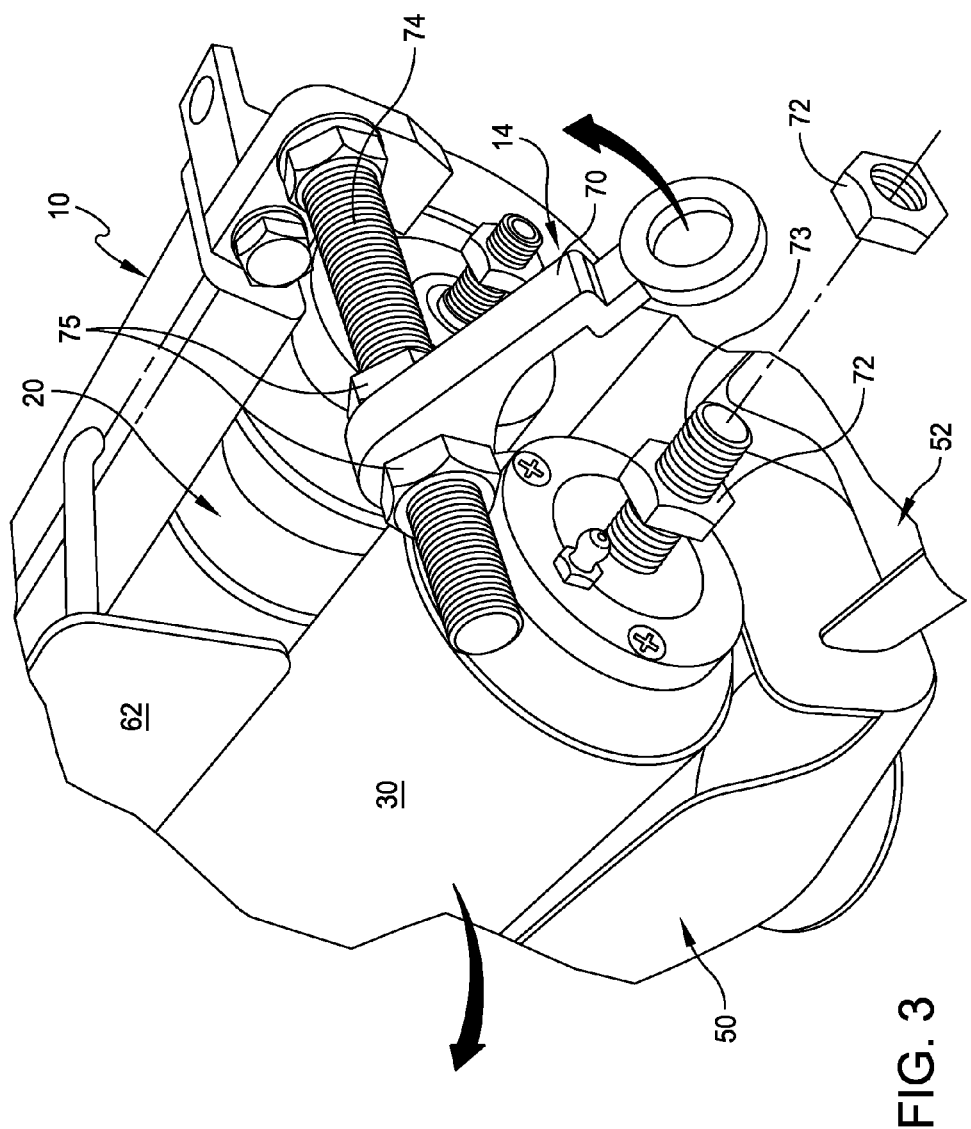

FIG. 3 also illustrates the mechanism 14 and the adjustment leg 70. The spacing between rollers, or in other words the adjustment between rollers, is provided at the distal end of the rollers by means of a threaded shaft 74 and a pair of nuts 75 that secure the arm 70 in place. By rotating the nut 75 in either direction, the position of the roller 30 may be varied at its distal end in its position relative to the roller 20. Reference is also made to FIGS. 1 and 4 in connection with an adjustment mechanism 80 that enables adjustment of the spacing between rollers at the respective proximal ends thereof. This adjustment is illustrated by the arrow 82 in FIG. 4. FIG. 4 also illustrates the very end of the shaft 32 received within the nut 85. This adjustment can occur by means of the threaded shaft 86 not 87 and respective plates 88 and 89. Various other adjustment means may be provided for adjusting the spacing between rollers and in particular for moving the roller 30 to different spacings relative to the fixed position, but rotatable roller 20. By adjusting the position of the nut 86, and a companion nut, not shown in FIG. 4, on the backside of the plate 89, one can move the support piece 85 in the direction of arrow 84 between different respective spaced apart positions.

As indicated previously, there are two separate versions for the segment 35 of the roller 30 shown in respective FIGS. 5 and 5A. In either case, and in connection with the diagram of FIG. 9, when the roller 20 is driven this causes the scallops to move in the direction of arrow 90 in FIG. 9. As the smaller scallops are received in a trough surface, the spacing between the rollers 20 and 30 is such that the smaller scallops fall into the tray 50. It is noted that the tray 50 extends along a substantial distance of the rollers 20, 30. Any of the larger scallops that will not fit between the trough surface and the roller 30, are discharged at the end of the rollers into the receiving tray 52. Although the smooth roller segment 35A is effective, it has been found that an alternate construction of using a helical segment 35 as shown in FIG. 5 is advantageous. The combination of the helical surface on the roller 30 along with the helical surface on the segment 35 provides a tendency for some limited counter force on the scallops. Many times even small scallops tend to be joined together and it is advantageous to, during the grading process, provide some counter force to break apart joined scallops. It has been found that the use of a helical surface with the turns in the same direction as the helical surface on the roller 20, provides this action.

Figure 8:
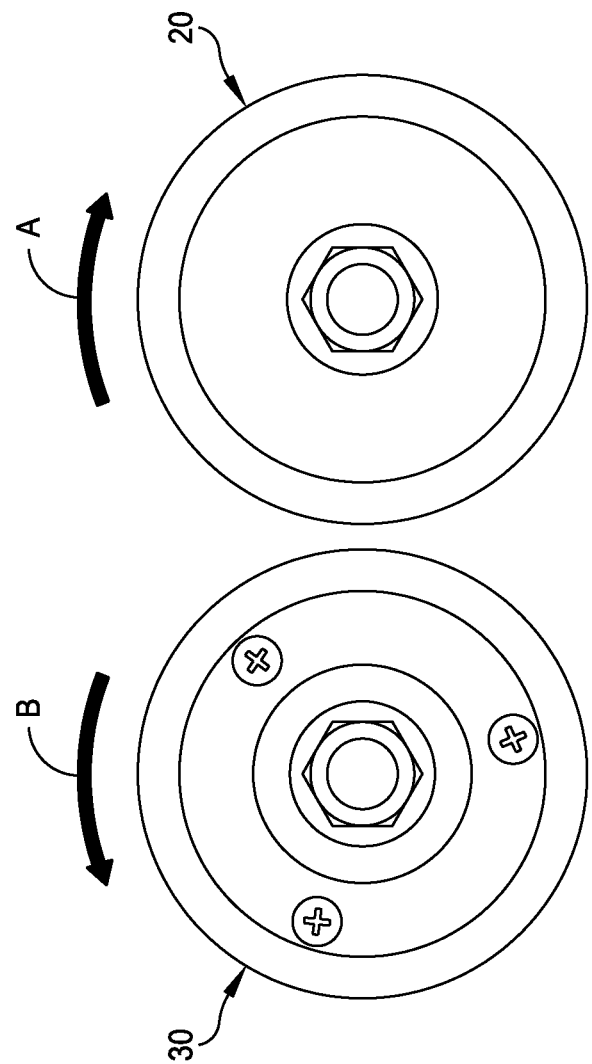

As noted in FIG. 8, the drive is such that the first and second rollers are driven in opposed clockwise and counterclockwise directions. The view of FIG. 8 may be considered as viewed from the distal end of the rollers. Thus, the roller 20 is rotated in a clockwise direction as indicated by the arrow A in FIG. 8. This causes a progression of the scallops along the rollers 20 and 30 such as in the direction of arrows 90 in FIG. 9. The rotation in the direction A in FIG. 8 causes a corresponding opposed rotation of the roller 30 as illustrated by the arrow B in FIG. 8. Because the turns are in the same direction on the roller surface of roller 20 as well as on the segment 35 of roller 30, this causes a limited counter force that tends to break joined scallops apart. The opposite direction rotation of the rollers 20 and 30 in combination with simple gravity of the scallops, causes the scallops to progress through the respective spaces so as to grade the scallops.

Reference is now made to an alternate embodiment of the present invention illustrated in FIGS. 10 and 11. In this embodiment, there have been added additional receiving trays 51 and 53 between the aforementioned trays 50 and 52. In the embodiment described in FIGS. 10 and 11, the same reference numbers are used where applicable. The main difference between the embodiment in FIGS. 10 and 11 and the embodiment previously described is that the roller 20 is now tapered. The roller 20 in FIG. 11 still has a helical construction with similar peak edges 24 and trough surfaces 26. However, it is noted that this taper provides a larger diameter at the proximal end of the roller 20 in comparison to the distal end of the roller. Thus, the space 95 between the rollers 20 and 30 is also tapered with the space 95 being smaller at the proximal end of the rollers and larger at the distal end thereof. In this way, there can be provided additional grading of scallops due to the gradual change in the spacing between the respective rollers.

Having now described a limited number of embodiments in the present invention. It should now be apparent to those skilled in the art that numerous other embodiments and modifications thereof are contemplated as falling within the scope of the present invention, as defined by the appended claims. For example, in the illustrated embodiments, the second roller is driven by means of a plate and disk contact from the first roller and in turn from a single drive motor. In an alternate embodiment of the present invention, other drive arrangement may be provided such as a gear or pulley arrangement. Also, separate drive motors could possibly be used for the respective first and second rollers. Also, an apparatus of a limited length has been illustrated. However, it is understood that the apparatus can be constructed in a variety of different lengths for providing any number of different gradings of scallops. Also, separate apparatus may be provided in tandem in which sets of rollers are spaced from one apparatus to the next. The helical surfaces that are described may be constructed of various types of materials including rubber, plastic, and even metal materials. Although one form of adjustment is illustrated such as by the mechanisms 14 and 80, it is understood that other types of adjustment mechanisms may be provided in order to adjust the position of the second roller relative to the first roller. Also, the adjustment need not be the same at each end of the roller.

What is claimed is:

1. A seafood grading apparatus, comprising:
a support frame;
a first roller supported from the frame;
a drive motor for rotating the first roller about a longitudinal axis thereof;
said first roller having a helical outer surface;
a second roller also supported from said frame and constructed and arranged in juxtaposition to said first roller;
said second roller constructed and arranged for driving about a longitudinal axis thereof and in unison with said first roller;
an inlet port for receiving pieces of seafood for the purpose of the grading thereof and arranged relative to said rollers to dispose the seafood between the rollers;
and at least two receiving trays disposed downstream of the inlet port for receiving different respective size seafood pieces;
wherein the second roller also has at least a section thereof that includes a helical surface that is in juxtaposition to the helical outer surface of the first roller; and
wherein the first and second rollers are driven in opposed directions and the first roller helical surface includes turns constructed and arranged to be in the same direction as turns of the second roller helical surface.

2. The grading apparatus of claim 1 wherein the drive motor is selected from one of an electrical motor, a pneumatic motor, a hydraulic motor or a manually driven mechanism.

3. The grading apparatus of claim 1 wherein the helical outer surface of the first roller includes a peak edge of helical form and a trough surface of helical form.

4. The grading apparatus of claim 3 wherein the size of the graded seafood is a function of a depth dimension between the peak edge and bottom of the trough surface.

5. The grading apparatus of claim 1 wherein the second roller also has at least a section thereof that includes a helical surface.

6. The grading apparatus of claim 5 wherein the first and second rollers are driven in opposed clockwise directions and the first roller helical surface includes turns constructed and arranged to be in the same direction as turns of the second roller helical surface.

7. The grading apparatus of claim 1 wherein the second roller has a smooth outer surface.

8. The grading apparatus of claim 1 wherein the second roller includes opposed end supports, at least one of which is adjustable as to the spacing between the first and second rollers.

9. The grading apparatus of claim 8 wherein the second roller is spring biased.

10. The grading apparatus of claim 8 wherein the spacing between the rollers is tapered so that there is a greater space at one end of the rollers than at the opposite end thereof.

11. The grading apparatus of claim 10 wherein the spacing is less at the inlet port end of the rollers.

12. The grading apparatus of claim 8 wherein both ends of the second roller are adjustable as to the separation space between the first and second rollers.

13. The grading apparatus of claim 12 wherein one or both ends of the second roller can be adjusted to vary a taper space between the first and second rollers.

14. The grading apparatus of claim 1 wherein said second roller has a helical surface that is shorter in length than the helical surface of the first roller.

15. The grading apparatus of claim 1 including more than two receiving trays disposed spaced along the length of the rollers.

16. The grading apparatus of claim 1, wherein the first roller has the helical surface tapered.

17. The grading apparatus of claim 16 wherein the tapered helical surface of the first roller relative to an un-tapered surface of the second roller provides a spacing between the rollers that is tapered so that there is a greater space at a distal end of the rollers than at an opposite proximal end thereof.

18. A method of grading seafood, particularly scallops, said method comprising the steps of:
    providing a first roller that has a helical outer surface includes a peak edge of helical form and a trough surface of helical form, and wherein the size of the graded scallops is a function of a depth dimension between the peak edge and bottom of the trough
    driving the first roller rotationally in a first direction and about a longitudinal axis thereof;
    providing a second roller that is constructed and arranged in juxtaposition to the first roller;
    driving the second roller about a longitudinal axis thereof and in unison with said first roller;
    disposing the scallops between the first and second rollers for the purpose of the grading thereof;
    and, upon the drive of the first and second rollers, receiving different respective size scallops in respective receiving trays;
    providing the second roller with at least a section thereof that includes a helical surface that is in juxtaposition to the helical outer surface of the first roller; and
    driving the first and second rollers in opposed directions with the first roller helical surface including turns constructed and arranged to be in the same direction as turns of the second roller helical surface.

19. The method of claim 18 including making the rollers adjustable as to the spacing between the first and second rollers.

20. The method of claim 19 wherein the spacing between the rollers is tapered so that there is a greater space at one end of the rollers than at the opposite end thereof.

* * * * *